United States Patent [19]
Turner et al.

[11] Patent Number: 5,518,176
[45] Date of Patent: May 21, 1996

[54] AUTOMOTIVE CLIMATE CONTROL WITH INFRA-RED SENSING

[75] Inventors: Jack C Turner, Kokomo; Peter A. Thayer, Indianapolis; Morgan D. Murphy, Kokomo, all of Ind.

[73] Assignee: Delco Electronics Corporation, Kokomo, Ind.

[21] Appl. No.: 382,702

[22] Filed: Feb. 2, 1995

[51] Int. Cl.$^6$ ................................................. G05D 23/00
[52] U.S. Cl. .................................. 236/49.3; 236/91 C
[58] Field of Search .................. 236/49.3, 91 C, 236/1 B, 78 D, 51, 1 R; 165/42, 43, 44; 62/180, 230

[56] References Cited

U.S. PATENT DOCUMENTS

| | | | |
|---|---|---|---|
| 2,562,538 | 7/1951 | Dyer | 73/355 |
| 2,835,779 | 5/1958 | Kazan | 219/20 |
| 4,856,710 | 8/1989 | Takada et al. | 236/1 B X |
| 5,054,686 | 10/1991 | Chuang | 236/91 C X |
| 5,145,112 | 9/1992 | Ueda | 236/49.3 |
| 5,148,977 | 9/1992 | Hibino, et al. | 236/49.3 |
| 5,172,856 | 12/1992 | Tanaka et al. | 236/91 C X |
| 5,187,943 | 2/1993 | Taniguchi et al. | 62/180 |
| 5,291,748 | 3/1994 | Ueda | 236/78 D X |
| 5,333,784 | 8/1994 | Pompei | 236/91 C |
| 5,400,964 | 3/1995 | Freiberger | 236/91 C |

FOREIGN PATENT DOCUMENTS

| | | | |
|---|---|---|---|
| 0195229 | 8/1986 | Japan | 374/132 |

OTHER PUBLICATIONS

U.S. Pat. application No. 08/158,555 Freiberger filing date Nov. 29, 1993.

*Primary Examiner*—Harry B. Tanner
*Attorney, Agent, or Firm*—Jimmy L. Funke

[57] ABSTRACT

An air temperature sensor and an infrared sensor are used along with an outside temperature sensor to control an HVAC system. During vehicle operation the IR sensor views an occupant seating area and realistically determines the thermal comfort level and the air temperature adds stability to that determination to control the air output. For dual zone systems two IR sensors separately monitor the two zones for accurate control of each zone air output. When the vehicle is not operating, the internal temperature is monitored and compared to a threshold and to outside temperature to turn on ventilation for limiting the internal temperature, subject to sufficient battery voltage.

11 Claims, 5 Drawing Sheets

FIG - 9

AUTOMOTIVE CLIMATE CONTROL WITH INFRA-RED SENSING

FIELD OF THE INVENTION

This invention relates to heating, ventilating and air conditioning (HVAC) systems for motor vehicles and particularly to a control for such a system utilizing infra-red sensing as well as air temperature sensing.

BACKGROUND OF THE INVENTION

It is common practice in automotive climate control to determine the thermal comfort level of a passenger compartment by drawing a stream of air from the compartment across a sensor to measure the air temperature and to estimate the effect of sun load on the occupants by a solar sensor mounted on top of the instrument panel for exposure to the sun. These measurements are combined with measurements of outside air temperature and engine coolant temperature to supply a control algorithm with the data needed to determine the optimum settings for HVAC mode, blower speed, and mixer door settings which together determine outlet air temperature and air speed needed to achieve a target temperature or comfort setting which is chosen by operator input.

The degree of success in achieving the desired comfort level varies according to specific design parameters including the placement of the solar sensor which for aesthetic reasons may be positioned where it is not the most effective. In any event, the measurement of sun load can be misleading in its computed effect on comfort since the sun direction, passenger clothing and other variables are not readily taken into account.

To avoid the drawbacks of solar load control as well as some objections to the conventional method of obtaining the air temperature, it has been proposed to replace both solar sensing and air temperature measurement with infrared (IR) sensing which directly detects the temperature of the occupant seating area and the occupants themselves. Thus irradiation from seat surfaces, occupant skin and occupant clothing, as well as any object in view of an IR sensor becomes the prime control parameter, and the air temperature in the passenger compartment is not considered at all. While this system affords an improvement over the prior systems by providing better correction for solar load and other sources of radiant energy within a vehicle, under many circumstances this correction can be too much, causing the system to overreact to introduction of hot sources. The air temperature has an effect on comfort and the system performance can be improved by including that measurement in the control algorithm.

Dual zone or multiple zone HVAC systems are already known to supply outlet air at different temperatures to different locations in the vehicle in accordance with individual temperature settings at each location. For example, the driver and passenger may have separate controls and separately managed air outlets. In the prior multiple zone systems the same temperature parameters, except for the selected target temperatures, are used to determine each air outlet temperature. The use of IR sensors, however, make it possible to improve those systems by separately measuring the irradiation from each zone.

It has been recognized that a major cause of discomfort during hot sunny days is that when a vehicle is idle, the interior can become extremely hot, so that upon first entering the vehicle the heat seems to be intolerable. The use of IR sensors make it practical to realistically monitor in-car temperatures even when the vehicle is not in operation and to prevent excessive temperatures by turning on ventilation.

SUMMARY OF THE INVENTION

It is therefore an object of the invention to incorporate the advantages of IR sensing in a climate control system while avoiding overreaction to changes in radiant energy in the vehicle. Another object is to enhance multiple zone HVAC systems by detecting and responding to the thermal condition of each zone. A further object is to control vehicle ventilation to prevent very hot conditions in an idle vehicle.

The climate control of an HVAC system uses a microcomputer to receive inputs from sensors and to control the system mode, blower speed and mixer door positions, thereby regulating the air output to the passenger compartment. The sensors comprise an IR sensor, an internal air temperature sensor, an outside air temperature sensor, and an engine coolant sensor. The latter only affects the mixer door position since the coolant temperature determines the hot air temperature in the system.

The IR sensor monitors the radiation level of the front seat and its occupants and includes a thermopile having a sensing junction affected by the radiation level of the scene and a reference junction. The reference junction may be warmer or cooler or the same as the sensing junction, and the thermopile output voltage is dependent on the difference in junction temperatures. A thermistor packaged with the thermopile is responsive to the reference junction temperature. A sensor circuit combines the thermistor and the thermopile outputs to generate a signal which in effect is the combined outputs of those sensors. The signal represents the absolute temperature of the scene and is linear at least in the target temperature range of the climate control.

The internal air sensor is an aspirated thermistor; i.e., a stream of the vehicle compartment air flows across the thermistor so that its output signal represents the internal air temperature. Conventionally, the air flow is produced by a suction arrangement attached to the ventilation blower assembly, but instead it can be produced by a separate motor driven fan.

In the microcomputer an algorithm combines the selected target temperature, IR sensor circuit output information, the internal air temperature information, and outside temperature information to select the HVAC mode (heating, cooling or ventilation) and the blower speed, and further includes engine coolant temperature to select mixer door positions. This combination of information yield an improved comfort level by responding to air temperature and sun load to achieve the selected target temperature without overreacting to the sun load or other radiation source affecting the IR sensor output.

Dual zone control is accomplished by two IR sensors or two thermopiles in the same sensor, each viewing the radiation from one zone, and separate temperature selectors for each zone. The microcomputer separately controls the air outlet to each zone using the same algorithm for each zone. Where the two thermopiles are close together or even in the same package, a single reference junction thermistor and sensor circuit can be used, either one of the two thermopiles being switched into the circuit as needed for each zone control computation.

Automatic ventilation of a vehicle while not in operation is carried out by sensing the in-car temperature by the IR sensor, sensing the outside temperature, and sensing the battery voltage, and turning on the ventilation if the sensed temperature is above a threshold and above outside temperature by a certain increment, and the voltage is above a given value. The ventilation is turned off in dependence on the same variables. Thus when inside temperature reaches a high value and the outside air is cool enough to effectively temper the inside temperature, the HVAC unit will blow in outside air. At all times, the ventilation is subject to available battery voltage since it is not desirable to run down the battery. An additional control may be to actuate the automatic ventilation only just prior to the time the operator expects to return to the vehicle thereby preventing excessive temperatures upon vehicle entry. This may be accomplished by a timer set by the operator according to a known schedule. Still another variable would be opening a sun roof for ventilation instead of or in addition to turning on a blower. In this case it would be desirable to also have a rain sensor to prevent opening the sun roof when it is raining.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
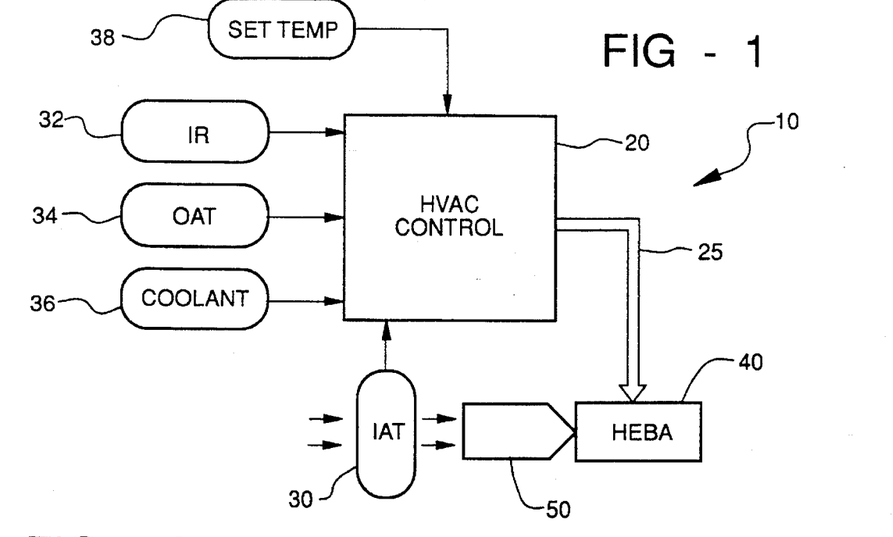
FIG. 1 is a diagram of a climate control system according to the invention.

Referring first to FIG. 1, a vehicle climate control 10 is shown comprising a heating, ventilation and air conditioning (HVAC) control 20 comprising a conventionally known microcomputer (not illustrated) having a central processing unit, ROM, RAM, I/O ports and A/D converters which receive various analog input signals from discrete sensors 30–36 and digitize the same for use in automated control of passenger compartment thermal level. Interior air temperature (IAT) sensor 30 and infrared (IR) sensor 32 provide the primary inputs to HVAC control 20 with outside air temperature (OAT) sensor 34 providing further data to HVAC control 20 for climate control. OAT sensor 34 provides in conjunction with IAT sensor 30 a differential measurement between the passenger compartment and the exterior environment which effects the rate of heat transfer therebetween, while the IR sensor 32 provides a measure of the radiation from the vehicle interior and occupants which provides radiant heat resulting from sun load, occupant's skin and clothing and other sources within the passenger compartment. Coolant temperature (COOLANT) sensor 36 provides a signal to HVAC control 20 which is indicative of the heat capacity of the heater core. Another input to the control includes an operator selected temperature setting signal (SET TEMP) 38 corresponding to the desired thermal level. The various inputs are monitored and processed for controlling temperature maintenance functions of the heater, evaporator and blower assembly (HEBA) 40 which, as the name suggests, includes; a heater core for circulating engine coolant for warming air, an evaporator core for circulating refrigerant for cooling air, a blower or fan for circulating air through the heater and evaporator cores in proportion to the position of an air mix door as determined by solenoid operated vacuum switches or electrical motors responsive to the HVAC controller outputs 25. The position of the air mix door determines the temperature of the air circulated by HEBA 40. The HEBA often times further includes control of exiting air to passenger determined modes such as lower, upper, bi-level, defog and defrost and entering air between fresh and recirculated modes. Solenoid controlled vacuum switches responsive to HVAC outputs 25 are the most prevalent actuators used for motive control of air delivery doors effective to establish the modes as described above. Electrical motor control of air delivery doors is also practiced in the art and is equally applicable to the present invention.

FIG. 1 further illustrates the means by which passenger compartment air temperature is measured. In addition to IAT sensor 30 which is normally positioned behind the instrument panel (not illustrated), aspirator tube 50 (functionally illustrated) is utilized to draw passenger compartment air in the vicinity of the front of the instrument panel across IAT sensor 30 for example by connecting the remote end of the tube to a high air flow portion of HEBA 40 through a venturi arrangement to generate a small air flow. A measure of the interior air temperature is thereby obtained.

Figure 2:
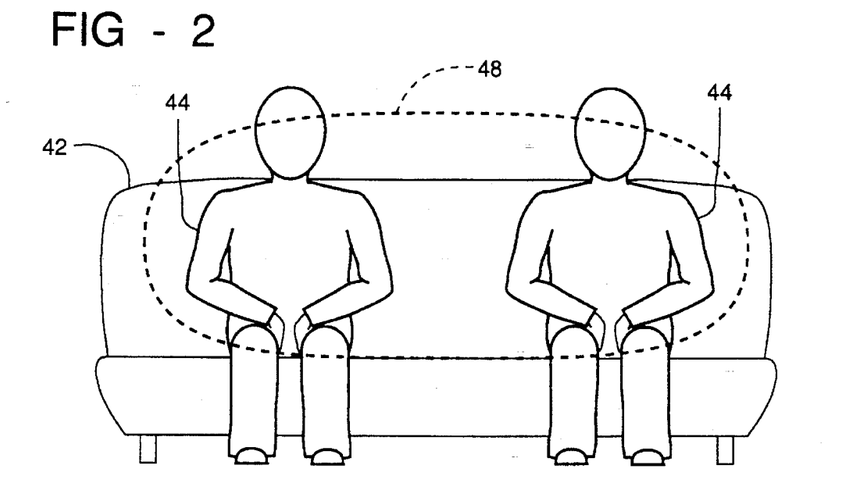
FIG. 2 is a view of a vehicle seat showing the field of view of an IR sensor for the system of FIG. 1.

Turning to FIG. 2, a vehicle seat is designated by the numeral 42 and an occupant by the numeral 44. An infra-red (IR) sensor assembly 32 is positioned within the passenger compartment of the vehicle such that the viewing field, indicated by the ellipse 48 is representative of predetermined portions of the seat 42 and occupant 44. Appropriate locations for the IR sensor assembly 32 include the vehicle instrument panel such that the viewing field is rear facing with respect thereto. This way, a good portion of passenger compartment is within the viewing field of the sensor. In a first embodiment, the IR sensor 32 has a relatively wide field of view as illustrated in two dimensions by the seat and passenger area delimited by the elliptical line 48.

The viewing angle of an IR sensor is determined by design of the sensor and, if inadequate for the desired viewing field, may be modified by lensing. A particularly attractive option for widening the viewing angle and minimizing dimensional penalty is to use a fresnel lens comprised of low loss material such as polyethylene.

Response of the sensor to different wavelengths of electromagnetic radiation can be controlled by the window material. Most of the energy of concern is in the ten micron wavelength range and an electromagnetic radiation sensor designed with windows providing admissibility in that range has been shown to perform adequately for providing a measure of passenger compartment thermal level. Silicon window material has been shown to provide approximately 60 percent admissibility in this range, with polyethylene window material improving this figure to approximately 90 percent. The various window materials therefore provide the means by which selective wavelengths of thermal energy are filtered for inclusion or exclusion depending upon the desired measurement.

Figure 3:
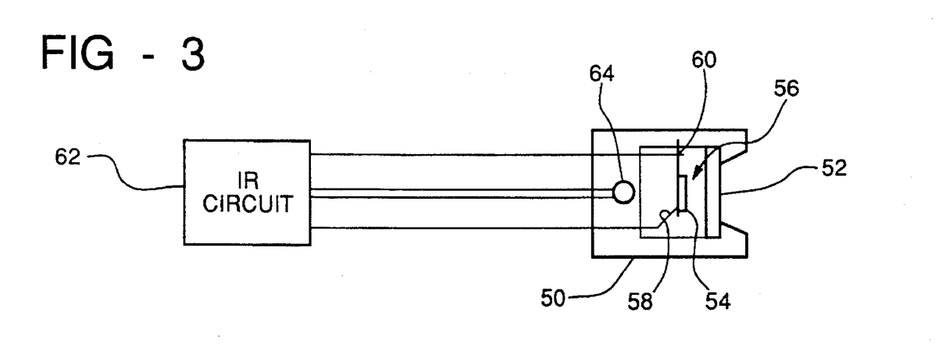
FIG. 3 is a schematic diagram of an IR sensor assembly for the system of FIG. 1.

FIG. 3 depicts an IR sensor assembly 32 which comprises a can 50 having a window 52 and a target region 54 which receives or transmits IR through the window 50 to approach the temperature of the viewed scene. A thermocouple or thermopile 56 has a sensing junction 58 at the target 54 and a reference junction 60 thermally coupled to the wall of the can 50. The thermopile 56 leads extend to an IR circuit 62. A thermistor 64 on the can senses the temperature of the reference junction and has leads extending to the circuit 62.

In the present embodiment, an IR sensor part number PL-82 available from Armtec/Ragen Incorporated, 10 Ammon Drive, Manchester, NH is utilized. This sensor is a twenty junction thermocouple device with a silicon window 52 and produces a voltage output on the order of 45 microvolts per degree fahrenheit. It is apparent that a change in passenger compartment thermal level of several degrees therefore will only result in voltage changes on the order of tens or perhaps hundreds of microvolts, which small signals pose unique amplification challenges. A cost effective and widely available means for signal amplification meeting the needs of this embodiment is a chopper stabilized amplifier in differential mode which is innately characterized by extremely low input offset voltage thereby being responsive to the small voltage changes provided by the IR sensor chosen. An exemplary circuit 62 is set forth in FIG. 4 for accomplishing a chopper stabilized amplification of the IR sensor signal wherein chopper stabilized amplifier 66 is designated a TL2654 available from Texas Instruments, Dallas, Tex. Exemplary component values are shown but are subject to modification according to required operation.

Figure 4:
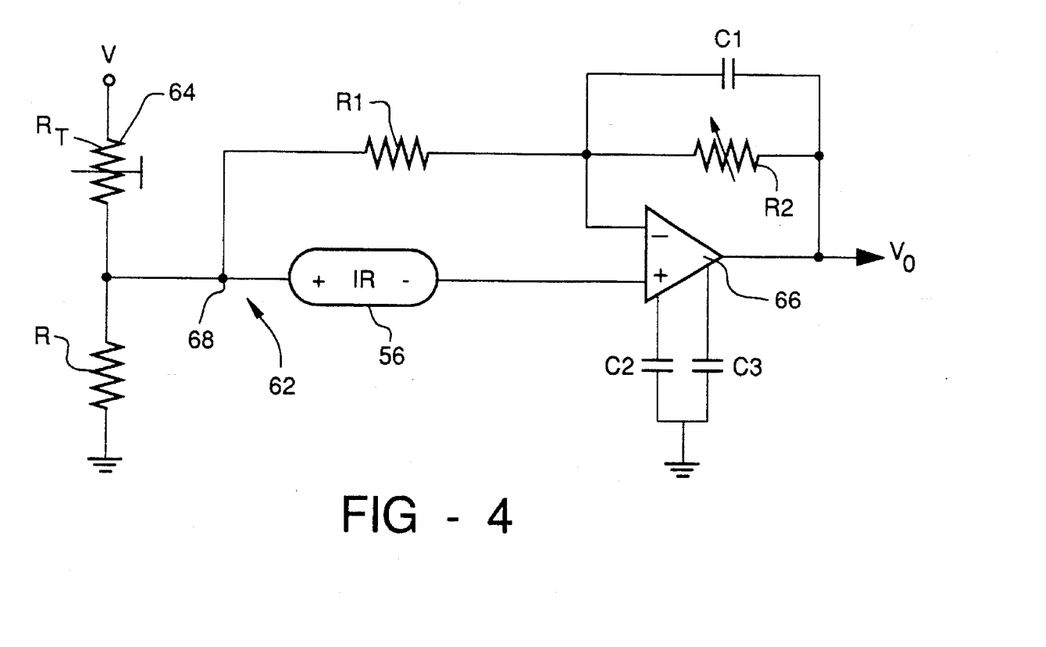
FIG. 4 is a circuit diagram for the sensor assembly of FIG. 3.

The present embodiment is configured for non-inverting operation having the non-inverting terminal connected to the positive terminal of the IR sensor. The negative terminal of the thermopile 56 is coupled to one end of a resistor R1 to establish offset node 68, the other end thereof coupled to the inverting input of the amplifier. The output of the amplifier is coupled through resistor R2 to the inverting input in feedback to establish the gain (G) of the circuit in accordance with a ratiometric relationship between R2 and R1[G= (R1+R2)/R1]. Integrating capacitor C1 is preferably coupled across the inverting terminal and the output in order to stabilize the output signal. Each of the capacitors C2,C3 shown coupled to ground provides storage of a potential for nulling the amplifier offset voltage during a respective one of amplifying or nulling phases of the chopper amplifier's operation. The output of amplifier 66 comprises a conditioned IR sensor signal for input into an HVAC control. An offset voltage substantially equal to one-half the operating voltage V of the amplifier is provided at offset node 68 established between thermopile 56 negative terminal and resistor R1 to allow operation through the entire operating voltage range. Output voltage is therefore represented by the equation:

$$Vo = Voff + G*Vir,$$

where Vo is the output voltage, Voff is the offset voltage, G is the gain and Vir is the IR sensor voltage.

As with any thermopile device, the voltage produced between two output terminals thereof is a function of the temperature differential between a set of measuring junctions and reference junctions; and, in the present embodiment, the chosen IR sensor produces a voltage signal substantially proportional to the difference in temperature. In the present embodiment using the above exemplary IR sensor, the measuring junctions are exposed through a silicon window to the passenger compartment infra-red radiation content, and the reference junctions are shielded therefrom so as to remain immune to thermal influences attributed thereto. The reference junction temperature will naturally tend toward a temperature in accordance with thermal influences apart from the infra-red radiation content of the passenger compartment from which they are shielded. These influences include convection from passenger compartment and instrument panel air and conduction from mounting means for the IR sensor and resistive heating of the junctions due to current flow therethrough. The sensor output will: 1) approach zero in the case where the reference junctions tend toward the passenger compartment thermal level as "seen" by the measuring junctions, or; 2) approach an offset in the case where the reference junctions tend toward some dominant local thermal influence such as a proximate incandescent light source.

The present embodiment therefore provides a compensation to the offset voltage applied at the offset node by using the thermistor 64 having variable resistance RT connected in series with a resistor R between a supply voltage V and ground, the junction being connected to the node 68 to supply the offset voltage Voff. The thermistor measures the temperature at the reference junctions, its negative coefficient of resistance causing adjustment to offset voltage Voff in proportion to the temperature change at the reference junction to null the effects of varying reference junction temperature from whatever influence. Therefore, the gain G as determined by the resistor pair R2 and R1 is chosen to produce this desired relationship whereby each unit of temperature change at the reference junctions produces a change to the term Voff which is balanced by the change in the term Vir multiplied by the gain G.

Figure 5:
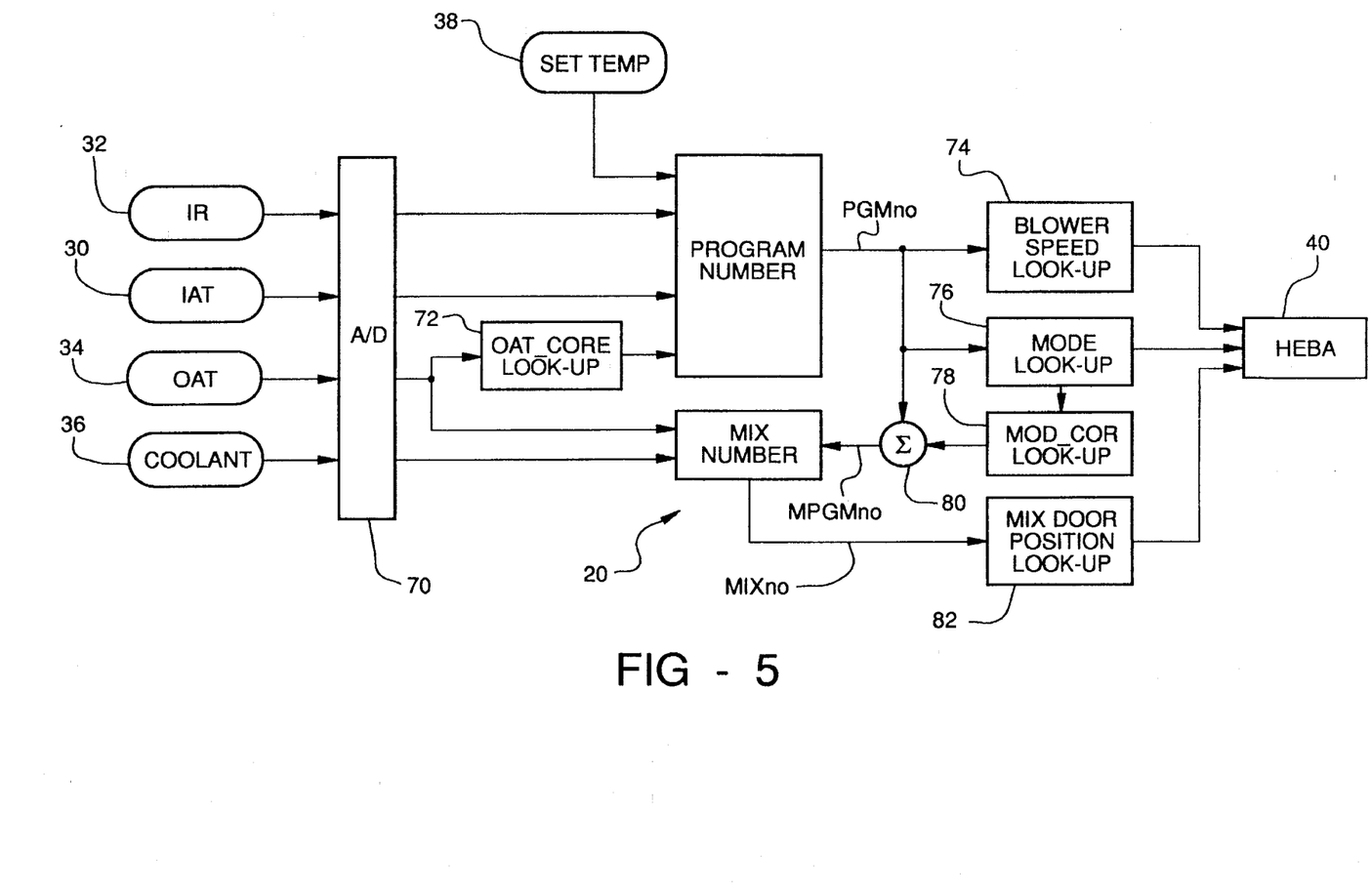
FIG. 5 is a detailed diagram of the climate control system of FIG. 1.

Elements of the illustrated preferred climate control architecture of FIG. 1 are further expanded in FIG. 5. IR sensor assembly 32 is shown as an input to an HVAC control. The internal air temperature sensor IAT 30 and outside air temperature sensor OAT 34 are illustrated. Coolant temperature COOLANT 36 is also shown with a signal therefrom as an input to the HVAC control. Operator selected temperature setting signal SET TEMP 38 is similarly shown as an input thereto. Sensors 30–36 and 32 are assumed to produce analog signals, which signals are passed to A/D converter 70 for digitization. The OAT output is converted to OAT_COR by a look up table 72. SET TEMP signal 38 is assumed a digital input signal commonly obtained from an instrument panel climate control operator interface at the instrument panel. Where SET TEMP signal is analog, A/D conversion can be employed to digitize the signal.

Control processing is advantageously described in terms of establishing a program number PGMno and air mix door number MIXno though other alternatives will be readily apparent to those possessing ordinary skill in the art. PGMno is established according to the following function:

$$PGMno = IAT + 5*(SET\ TEMP) + IR + OAT\_COR + K)$$

where IAT is the internal air temperature signal from sensor 30, SET TEMP is the operator temperature setting, IR is the passenger compartment thermal level as established by the IR sensor assembly 32, OAT_COR is the outside air temperature correction factor from calibration table 72, and K represents a calibration constant to scale PGMno into a number range compatible with the microcomputer architecture (0<PGMno<255 for 8 bit architecture). PGMno is then utilized to reference blower speed and mode for HEBA 40 operation such as through calibration tables 74 and 76, respectively. The mode is also used for the look-up from calibration table 78 of a corrective value MOD_COR associated therewith and summed with PGMno at node 80 to establish a mode corrected program number MPGMno.

For control of mixer door position, MIXno is established according to the following general function:

$$MIXno = f(COOL, \Delta T(COOL, Te), MPGMno, K1, K2)$$

where COOL is the coolant temperature as established by coolant sensor 36, Te is a predetermined evaporator temperature equivalent to a fixed calibrated value when the compressor is cycling and to the ambient temperature as measured by OAT sensor 34 when the compressor is not cycling, MPGMno is the mode adjusted program number, and K1 and K2 represent calibration constants used to scale the function into a number range compatible with the microcomputer architecture (0<MIXno<255 for an 8-bit architecture). MIXno is then utilized to select a temperature door position from the mix door position look-up table 82. This selected door position is used in positioning the air mix door in HEBA 40.

It has been found that this arrangement using the IR signal in conjunction with IAT and the other inputs gives superior control of temperature without the need for solar sensors and in particular improves the correction for radiant energy sources such as sun load.

Figure 6:
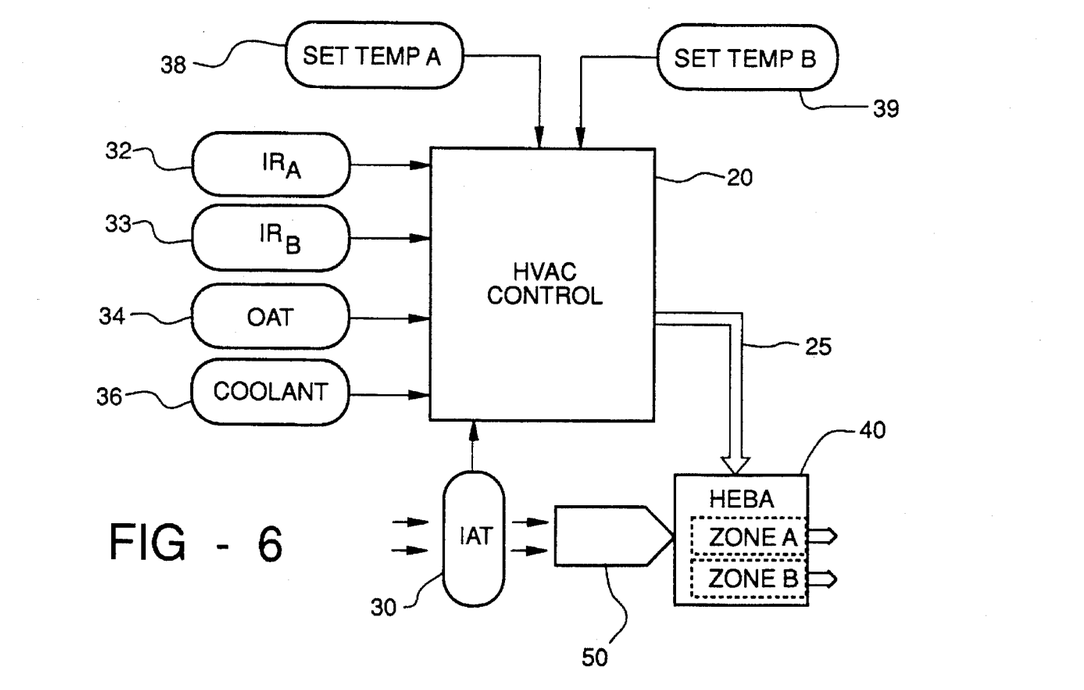
FIG. 6 is a diagram of a climate control system according to another embodiment of the invention.

The same control advantages apply to dual zone or multiple zone systems. As shown in FIG. 6, by using two IR sensors 32 and 33, called IRa and IRb, and separate user controls 38 and 39 to set temperature A and temperature B, two zones, A and B can be individually controlled. Typically the two zones have common mode and common blower speed, and separate mixer doors are set according to individual needs. The HVAC 20 readily calculates the MIXno for each zone using the same algorithm for both zones with the appropriate IR and Set Temp inputs for each zone.

Figure 7:
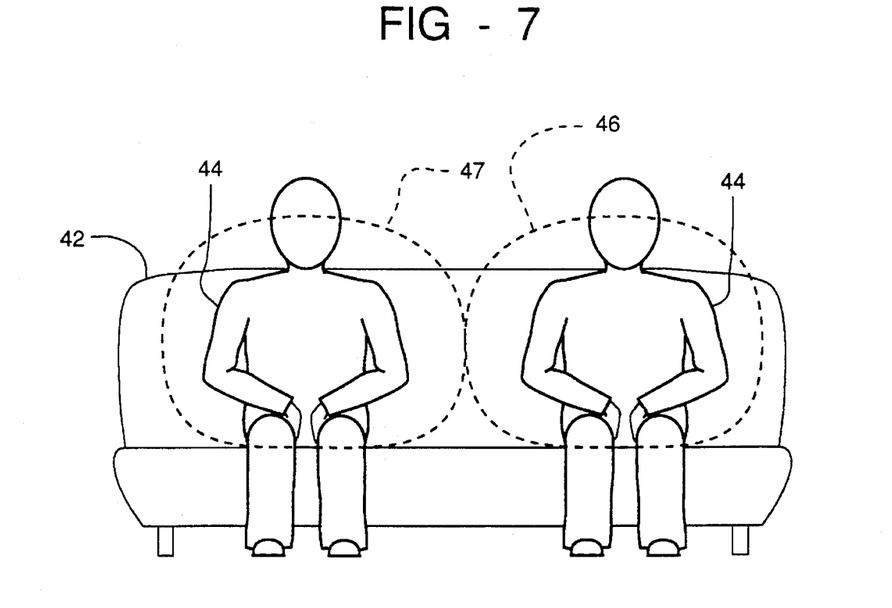
FIG. 7 is a view of a vehicle seat showing the fields of view of IR sensors for the system of FIG. 6.
Figure 8:
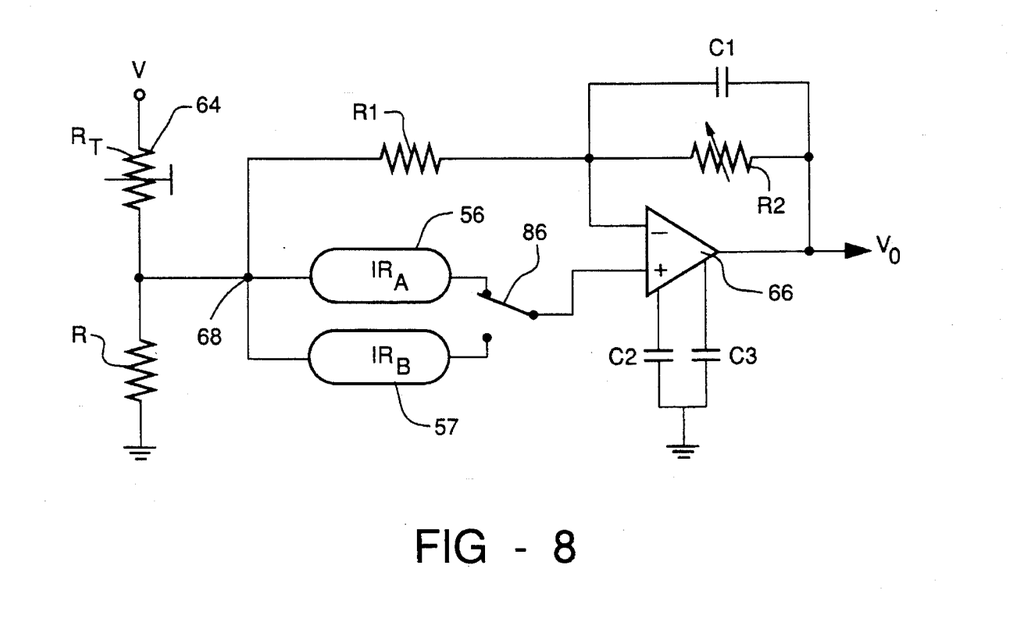
FIG. 8 is a schematic diagram of an IR sensor assembly for the system of FIG. 7.

FIG. 7 illustrates the application of two IR sensors 32 and 33 which view local zones 46 and 47 respectively, so that the thermal level of each zone is sensed. It often occurs that sun load affects one side more than the other so that the thermal levels as detected by the IR sensors may differ considerably. If the sensors 32, 33 are physically close to each other, they may use the same IR circuit to generate both IR output signals on a time sharing basis. Referring to FIG. 8, the thermopile 56 of sensor 32 and the thermopile 57 of sensor 33 are connected together at the node 68 at one end and are coupled through a switch 86 to the amplifier 66. The switch is controlled in concert with the HVAC control for employing each IR sensor according to which zone control settings are being calculated.

When a vehicle is left unattended under conditions of high sun load, the interior becomes very hot. To precool the vehicle the blower may be turned on as needed to circulate cooler outside air into the vehicle. The interior temperature as sensed by the IR sensor is used as the primary parameter and is compared to a threshold and the outside temperature for controlling the blower. A program run by the HVAC controller 20 is given in FIG. 9 for a precool control, using particular parameter values which are not necessarily the optimum values for a given application but which illustrate the control method. Using this algorithm the IR temperature is checked every four minutes when the vehicle is off and compared to a 115° F. degree threshold and to outside temperature. When preset conditions are met the system blower is turned on and then every four minutes the temperature is checked to determine when to turn the blower off. In any event the program is interrupted if the vehicle is started.

Figure 9:
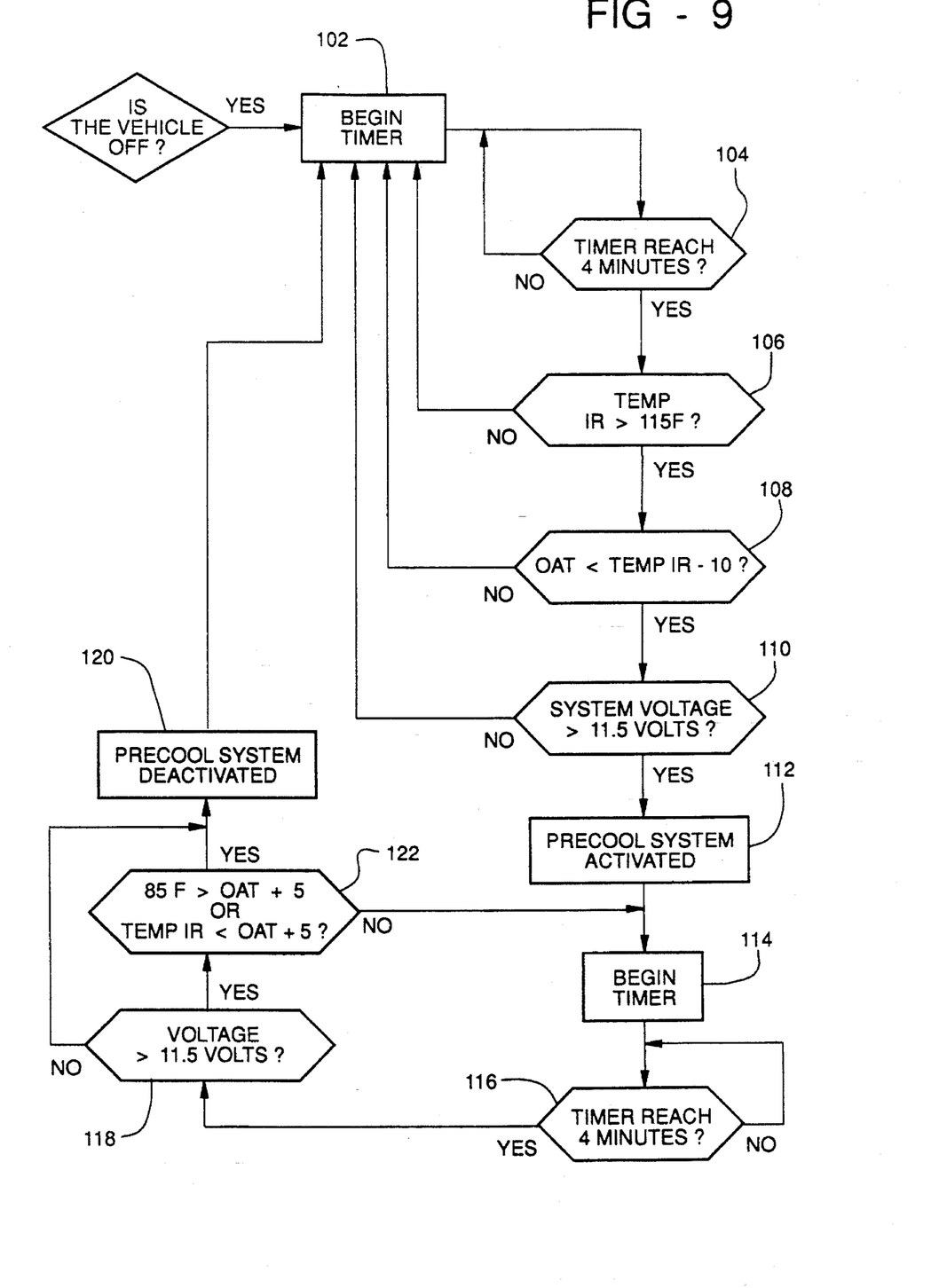
FIG. 9 is a flow chart representing a program for system operation to carry out a precool function, according to the invention.

Referring to FIG. 9, the description of the flow chart contains numerals in angle brackets <nnn> which refer to functions in blocks with corresponding reference numerals. The programmed is entered if the vehicle is off <100> and then a four minute timer is started <102>. If the timer reaches four minutes <104> the IR temperature is compared to a 115° F. threshold <106>. If the IR temperature does exceed the threshold it is determined whether the temperature is at least 10° higher than the outside temperature OAT <108>. If it is, the system voltage is checked to assure that it is above 11.5 volts <110>. Then the precool system is activated to operate the blower <112>. If any condition in blocks 106, 108 and 110 is not met, the timer is restarted <102>. Once the precool system is activated, another four minute timer is started <114> and when it times out <116>, the system voltage is tested <118> and the system is deactivated <120> if the voltage falls below 11.5 volts. If the voltage is above that limit, two temperature conditions are tested <122>: if the IR temperature is below 85° or the IR temperature is within 5° of the outside temperature OAT, the precool system is deactivated <120>; otherwise the timer is restarted <114>.

Since the operation of the precool system is limited by vehicle battery limitations, it is desirable to further enhance it by selectively determining when it may be operative, thereby permitting the ventilating function only when vehicle usage is imminent. For example, a scheduling timer may be set by the operator to indicate the next expected vehicle use or may be programmed with a daily schedule of use which is stored for use each day or on predetermined days. Then the algorithm of FIG. 9 would be entered. Still another scheduling system would employ an adaptive algorithm to learn an operator's schedule by monitoring the vehicle usage over some time period.

We claim:

1. In an automotive vehicle, a climate control system for establishing and maintaining a passenger compartment comfort level according to a preset level comprising;

infra-red sensing means for viewing a predetermined portion of the passenger compartment for radiant heat therein and producing a thermal level signal;

an air temperature sensing means for sampling air temperature in the passenger compartment and producing an air temperature signal; and control means responsive to the thermal level signal and the air temperature signal for controlling an HVAC system to establish and maintain the passenger compartment comfort level according to the preset level, wherein airflow into the passenger compartment is determined as a function of a linear Combination of the thermal level signal and the air temperature signal, the function being independent of ti..me rate of Change of the thermal level signal.

2. The invention as defined in claim 1 wherein the air temperature sensing means comprises means for producing a stream of passenger compartment air, a thermistor in the stream and a circuit including the thermistor for producing the air temperature signal.

3. The invention as defined in claim 1 wherein the infra-red sensing means comprises:

a thermocouple means having a measuring junction exposed to radiant heat and a reference junction for producing a first signal dependent on the difference in junction temperatures; and a base thermistor coupled to the reference junction of the thermocouple means for producing a second signal dependent on the reference junction temperature; and means responsive to the first and second signals for generating the thermal level signal.

4. The invention as defined in claim 3 wherein:

the air temperature sensing means comprises means for producing a stream of passenger compartment air, a thermistor in the stream and a circuit including the thermistor for producing the air temperature signal.

5. The invention as defined in claim 1 wherein: the HVAC system has multiple zones each for selectively effecting the thermal level in various portions of the passenger compartment;

the infra-red sensing means includes a plurality of sensors, each producing a signal for each zone; and the control means is responsive to each sensor signal to establish and maintain the thermal level of each zone.

6. The invention as defined in claim 1 wherein:

the HVAC system has first and second zones each for selectively effecting the comfort levels in different portions of the passenger compartment;

the infra-red sensing means includes means for separately viewing first and second zones of the passenger compartment for radiant heat therein and producing a thermal level signal for each zone; and the control means is responsive to the thermal level signal for each zone to establish and maintain the comfort level of each zone.

7. The invention as defined in claim 1 wherein:

the HVAC system has first and second zones each for selectively effecting the comfort levels in different portions of the passenger compartment;

first and second thermocouple means responsive to the radiant heat in the respective zones, each thermocouple means having a measuring junction exposed to radiant heat and a reference junction for producing an IR signal dependent on the difference in junction temperatures; and a base thermistor coupled to the reference junction of the thermocouple means for producing a reference signal dependent on the reference junction temperature; and a circuit alternately responsive to the IR and reference signals for each zone for generating thermal level signals for each zone.

8. In an automotive vehicle, a climate control system for establishing and maintaining a passenger compartment comfort level according to a preset level, wherein the system is effective to ventilate the vehicle when the vehicle is idle, comprising;

battery voltage sensing means;

outside air temperature sensor means for producing an outside temperature signal;

infra-red sensing means for viewing a predetermined portion of the passenger compartment for radiant heat therein and producing a thermal level signal, wherein the thermal level signal represents a surface temperature;

an air temperature sensing means for sampling air temperature in the passenger compartment and producing an air temperature signal; and control means responsive to the thermal level signal and the air temperature signal for controlling an HVAC system to establish and maintain the passenger compartment comfort level according to the preset level, the control means further being responsive to the outside temperature signal and battery voltage for operating the HVAC in ventilation mode when the surface temperature is above a first threshold, the surface temperature exceeds the outside air temperature by a set amount, and the voltage is above a voltage threshold.

9. The invention as defined in claim 8 wherein:

the control means is effective to terminate operation in the ventilation mode when the battery voltage is below a minimum threshold, or the surface temperature is less than a set increment above the outside air temperature, or the surface temperature is below a second threshold.

10. In an automotive vehicle, a climate control system effective to ventilate the vehicle when the vehicle is idle, comprising;

battery voltage sensing means;

outside air temperature sensor means for producing an outside temperature signal;

infra-red sensing means for viewing a predetermined portion of the passenger compartment for radiant heat therein and producing a thermal level signal, wherein the thermal level signal represents a surface temperature;

control means responsive to the outside temperature signal and battery voltage for operating an HVAC system in ventilation mode when the surface temperature is above a first threshold, the surface temperature exceeds the outside air temperature by a set amount, and the voltage is above a voltage threshold.

11. The invention as defined in claim 10 wherein:

the control means is effective to terminate operation in the ventilation mode when the battery voltage is below a minimum threshold, or the surface temperature is less than a set increment above the outside air temperature, or the surface temperature is below a second threshold.

\* \* \* \* \*